Feb. 21, 1967 G. R. MADLAND 3,304,594

METHOD OF MAKING INTEGRATED CIRCUIT BY CONTROLLED PROCESS

Filed Aug. 15, 1963 10 Sheets-Sheet 1

INVENTOR.
Glen R. Madland

BY
Mueller & Aichele
ATTY'S

INVENTOR.
Glen R. Madland
BY Mueller & Aichele
ATTY'S.

Feb. 21, 1967 G. R. MADLAND 3,304,594

METHOD OF MAKING INTEGRATED CIRCUIT BY CONTROLLED PROCESS

Filed Aug. 15, 1963 10 Sheets-Sheet 3

INVENTOR
Glen R. Madland

BY

ATTY'S.

INVENTOR.
Glen R. Madland
BY Mueller & Aichele
ATTY'S.

METHOD OF MAKING INTEGRATED CIRCUIT BY CONTROLLED PROCESS

Filed Aug. 15, 1963 10 Sheets-Sheet 5

INVENTOR.
Glen R. Madland
BY Mueller & Aichele
ATTY'S.

INVENTOR.
Glen R. Madland
BY Mueller & Aichele
ATTY'S.

METHOD OF MAKING INTEGRATED CIRCUIT BY CONTROLLED PROCESS

Filed Aug. 15, 1963

INVENTOR.
Glen R. Madland
BY
Mueller & Aichele
ATTY'S.

INVENTOR.
Glen R. Madland
BY Mueller & Aichele
ATTY'S.

INVENTOR.
Glen R. Madland
BY
Mueller & Aichele
ATTY'S.

INVENTOR.
Glen R. Madland
BY
[signature] Mueller & Aichele
ATTY'S.

United States Patent Office 3,304,594

Patented Feb. 21, 1967

3,304,594

METHOD OF MAKING INTEGRATED CIRCUIT BY CONTROLLED PROCESS

Glen R. Madland, Phoenix, Ariz., assignor to Motorola, Inc., Franklin Park, Ill., a corporation of Illinois Filed Aug. 15, 1963, Ser. No. 302,322
8 Claims. (Cl. 29—25.3)

This invention relates to the manufacture of solid state microcircuits and components and particularly to a method of controlling the procedures used in fabricating monolithic integrated circuits and of determining their reliability.

Monolithic integrated circuits, i.e., circuits that are complete on a single piece of semiconductor material, like many type of high frequency transistors, are usually manufactured in batches on wafers of semiconductor material to facilitate handling and processing. Present process control methods include in most cases making resistivity and thickness measurements on diffused regions and regions deposited and defined by various thin film techniques.

Many of the process control methods in integrated circuit processing require the destruction of several integrated circuits per wafer at many of the manufacturing steps in order to properly monitor the processes. The tests in addition to being destructive in some cases are very time consuming as well. To check a diffusion step in the function of a PN junction, for example, a customary procedure has been to cut out several integrated circuit chips from the wafer, strip the oxide formed during diffusion from them and measure the sheet resistance of the diffused regions. The semiconductor material of the chip is then lapped away at an angle, stained for contrast, and the stained region measured with an interferometer to determine the depth of diffusion. In general, any testing procedures requiring the removal of a chip from a wafer-in-process may be considered as destructive since when the chips are no longer a part of the wafer they cannot be completed and are therefore of little value other than as scrap.

It is, of course, possible to obtain information on the nature of the processing steps by making measurements on the components of the circuit at various stages of manufacture, and it may not, therefore, be necessary to remove the chip from the wafer. However, where integrated circuits are to be tested, it is necessary, since integrated circuits and their components are usually quite small, that temporary electrical contact to them for in-process testing purposes be accomplished by pressing sharp pointed probes into the regions to be tested. The pressures exerted by the probe points, even when lightly loaded, are considerable and may result in damage to the silicon crystal. Careless probing after metallization may also scratch very thin metallized component contacts and connectors of the circuit causing high resistance connections and occasionally connection failure.

There are other process control methods in which test wafers of silicon are processed concurrently with the integrated circuit wafer but these test wafers do not yield the quality of information provided by portions of the integrated circuit wafer itself since the material and processing constants will usually differ slightly. For example, there may be slight differences in the resistivity and uniformity of the wafers, and so forth.

Reliability assurance techniques, i.e., the testing methods which will determine the probability that a system or component will function satisfactorily in a specified environment for a specified period of time are, for integrated circuits, becoming of increasing concern as the usage of such circuits becomes more widespread.

Reliability is frequently determined by aging studies to determine failure rates with time. Semiconductors and integrated circuit components in general have long lifetimes so that it is necessary to use testing procedures which greatly accelerate the aging of components. Destructive step-stress testing at increasing temperature and/or voltage levels gives a great deal of reliability information in a short period of time. Under the stress of high temperature and operating voltages, circuit components age and tend to fail in a greatly accelerated manner. Typically, transistors under test may be aged the equivalent of hundreds of years of normal temperature use in a few hundred hours of use at high temperatures. In step-stress testing, as an example, sample units may be continuously under test for a period of time such as one day at 200° C., the following day at 250° C. with the temperature progressively increased on succeeding days until all units fail. Optionally, the operating voltage may be kept constant or increased. Statistical information developed from the results of the step-stress testing allows a prediction to be made as to whether the probable lifetime of the same kind or similar components as those tested will be adequate for their intended use.

Conventional circuits lend themselves to reliability studies much more readily than integrated circuits, and reliability assurance methods for conventional circuits have become fairly standard throughout the industry. Capacitors, diodes, resistors and other individual components used within a conventional circuit will usually have different characteristics and tolerances, but before the components are interconnected, each component can be tested to its maximum stress limitations without being influenced by other components.

With an integrated circuit, particularly the monolithic variety (i.e., a circuit on a single substrate of semiconductor material), this procedure is generally not effective because all component parts of the circuit are usually connected or coupled in some manner. Thus, the stress testing of one particular part could jeopardize all other parts on the substrate and cause the breakdown of a complete circuit; or other components might tend to so modify the environment as to limit the stress applied to a particular component under test. Since the probable reliability of a circuit is no better than that of its poorest component, to predict reliability it is desirable to be able to expose each representative type of circuit component to maximum stress.

Moreover, the testing of individual parts of an integrated circuit is further complicated by the fact that some of them are completely covered by several layers of protective oxide material which makes these parts virtually inaccessible unless special ohmic contacts are brought through the oxides.

Additionally, because many integrated circuits are developed and manufactured on a custom-built basis in small quantities (as compared with the millions of discrete electrical components such as capacitors, resistors and transistors manufactured for general circuitry application), it is economically impractical to place thousands of different integrated circuits on life test for millions of device hours in order to verify reliability as is done with individual components.

In view of these major differences between conventional circuits and integrated circuits, it becomes obvious that the standard methods of reliability verification cannot be applied successfully to this new art. Rather, a new reliability verification concept has been sorely needed in order to avoid the conventional requirement for millions of device hours of life test data and circumvent the difficulties of destructive testing of complex circuits, and yet, at the same time, provide the assurance of proper circuit performance and continuing reliability.

Accordingly, a major object of this invention is the provision of an adequate process control method which is simple, convenient, non-destructive and valid.

The provision of a reliability verification method that meets the requirements previously referred to is another object of this invention.

The invention features a method of verifying that integrated circuit fabrication processes and components in an integrated circuit on a given wafer of semiconductor material meets specification, by analyzing special control components prepared on the same wafer but which are not functional parts of the integrated circuit.

Another feature is the use of special integrated circuit test patterns prepared on a given wafer of semiconductor material to provide the detailed data necessary for reliability assurance of a functional integrated circuit prepared concurrently on the same wafer.

In accordance with the invention, integrated circuits manufactured in batch type processing, in which a large number of circuits are formed on discrete areas on a wafer of silicon, may be monitored during processing and evaluated for quality by testing a number of especially designed structures which are formed on the wafer as a part of the integrated circuit processing. These structures, which are called integral control patterns, also occupy discrete areas on the wafer separate from the areas containing the integrated circuits. The control patterns are so designed that they may be quite easily tested to obtain quality control information on the processes used to form the integrated circuits and to provide step-stress testing information as well since information of this type is not readily or economically obtained directly from the testing of integrated circuits.

Figure 1:
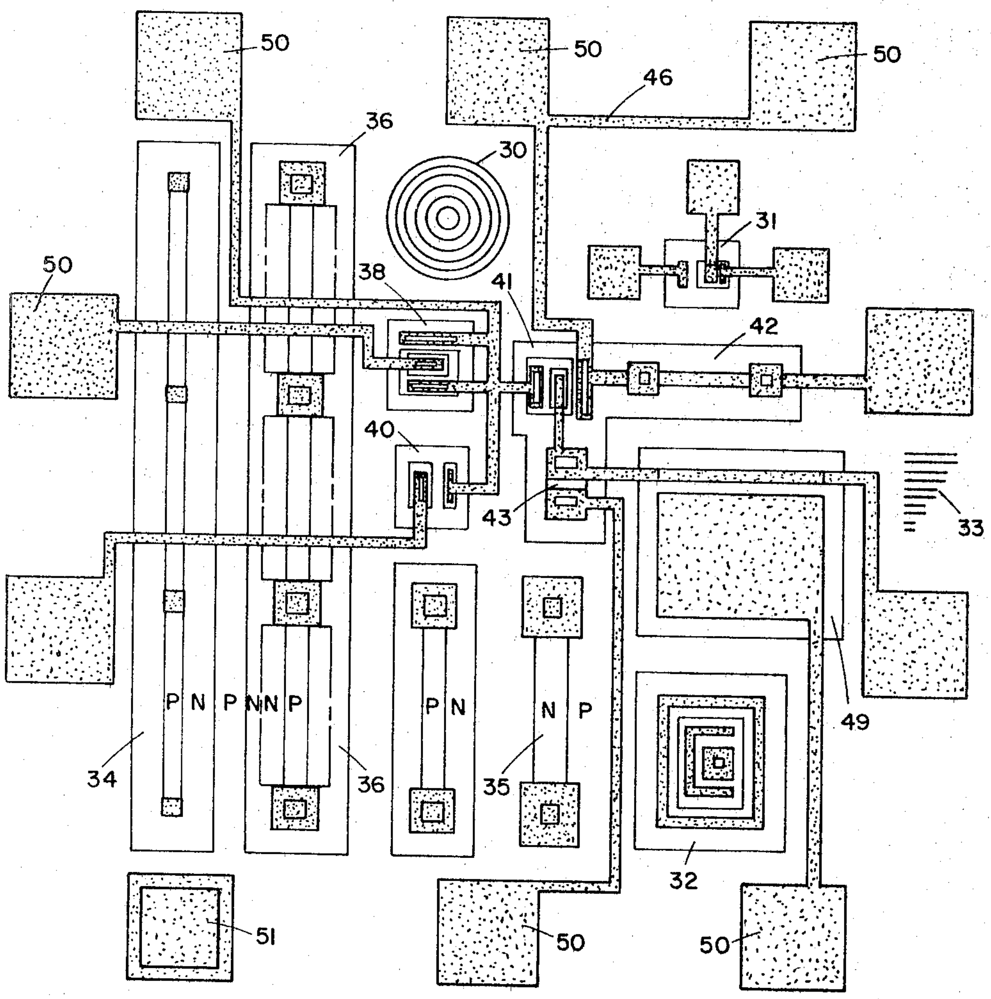
FIG. 1 shows, as an embodiment of this invention, a plan view of a complete but unmounted integral control pattern.

FIG. 1, a plan view of one type of a complete integral control pattern, is a composite of a number of control subpatterns used to monitor processing operations (process control). The complete pattern and the sub-patterns used to build it up are tested so as to provide data which is indicative of the reliability of integrated circuits processed at the same time under identical conditions.

Figure 2:
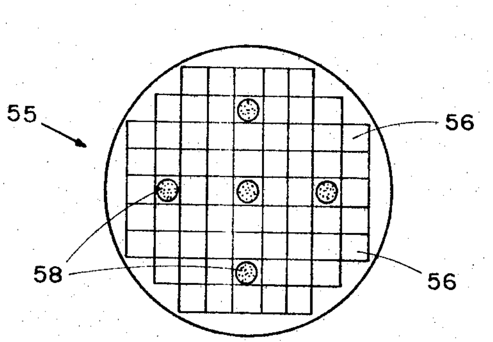
FIG. 2 is a silicon wafer which includes a large number of integrated circuits and which has five integral control patterns on it.

Typically, integrated circuits are prepared in a batch on a wafer 55 of silicon as shown in FIG. 2. Customarily each square 56 becomes an integrated circuit. A single thin disk-shaped wafer something over an inch in diameter may have up to a hundred or more individual integrated circuits formed upon it. Near the end of the process, these are subsequently cut from the wafer into separate discrete units called chips. The manufacturing process is much like the preparation of quantities of diffused transistor elements on a wafer of silicon.

The present invention requires the substitution of control patterns for a few of the integrated circuits on the wafer, the patterns to be used for testing purposes. The circled regions on the wafer 58 are shown in this manner simply to illustrate or represent typical locations of such patterns. Testing of the processes used in fabricating the integrated circuits and of the component parts of the circuit is to be performed on the control patterns rather than on any of the integrated circuits.

The integral control pattern embodiment detailed herein is for diffused integrated circuits and components, and was chosen for the specification since it is one of the simplest types to describe. The concept, however, is equally applicable to other types including those integrated circuits using resistors and capacitors and other components made by thin film methods. The operations and their sequence will be different for integrated circuits of this type and the control patterns are somewhat different than that shown and described. Such patterns may also include representative thin film components fabricated at the same time and in the same manner and on the same wafer as the integrated circuits to which they correspond as is the case in this embodiment. In a much simplified form, integral control patterns are also well-suited for process control in the manufacture of transistors, diodes or other components in which the manner of preparation involves preparation of the components in quantity on a wafer of semiconductor material.

Referring to FIG. 1, it is apparent that a large number of items make up this finished integral control pattern. These items, some of which are interconnected in circuit form, each have a test function which will be discussed subsequently. In the particular embodiment shown, this is an alignment pattern of concentric circles 30, a UHF transistor 31, a large standard transistor 32, a resolution pattern 33, a base resistivity unit 34, an epitaxial material resistivity unit 35, a base width measurement unit 36, a high speed PN diode 38, a high speed NP diode 40, a standard transistor 41, a large resistor 42, a small resistor 43, a junction type capacitor 49 and a short circuit connection 46. The darker regions indicate metallization for electrical contact and connection purposes to the various components.

The integral control pattern of FIG. 1 is a composite pattern constructed in the identical manner as the integrated circuits. The layout, geometrical structure and circuit are different, however. Most component types are typical, except that a few additional types may be present to provide additional data. The design of the pattern is such that process results and circuit components are easily and properly tested.

For illustration, the manufacture of a group of integrated circuits along with integral control patterns may be considered as beginning with a wafer of P type silicon having a thin layer of N type epitaxial silicon on one surface. The wafer is oxidized to form a dense film of silicon dioxide over all of the silicon.

Figure 3:
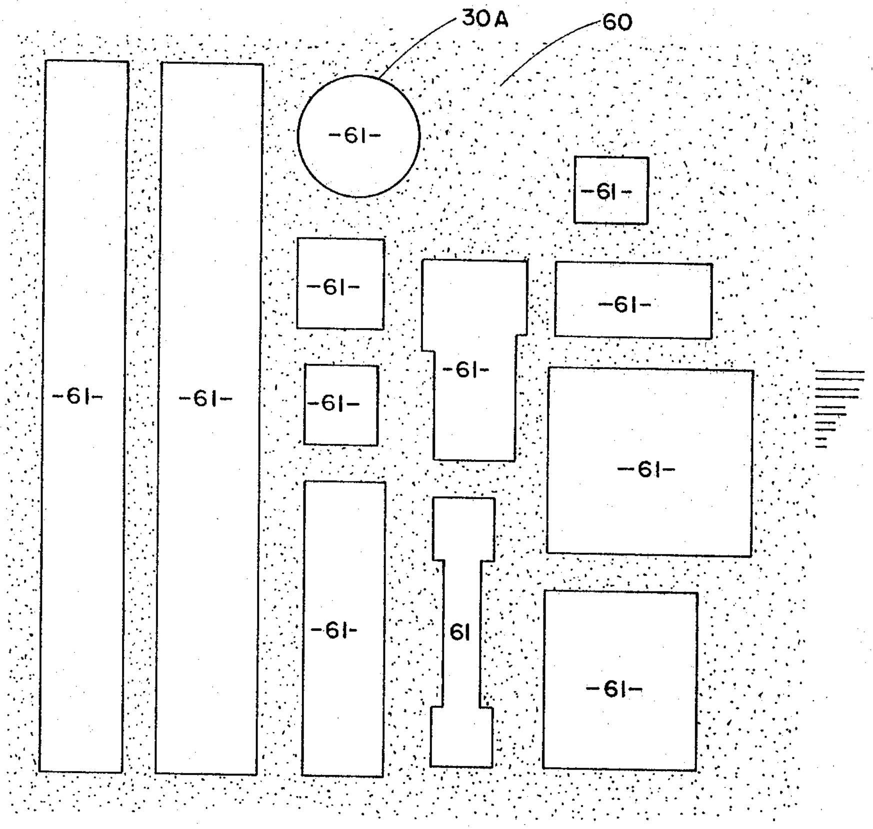
FIG. 3 is a photographic masking pattern used with photo resist emulsions to form patterns of acid resistant material on oxidized silicon wafers for selectively etching away regions of the silicon dioxide as a preparation for a selective diffusion step with P type impurity.

After oxidizing, the wafter is processed using a well-known photolithographic procedure in order to prepare it for a first selective solid state diffusion step. A photo resist masking material such as the commercially available emulsion KMER (Kodak Metal Etching Resist) is coated uniformly on the epitaxial silicon material and then a first photographic pattern is placed on the masking emulsion. This photographic pattern, like all photographic patterns used subsequently in the processing, is comprised of a large number of small sub-patterns, one for each integrated circuit, and a few small sub-patterns for control purposes. The photographic pattern in both the circuit and control portions has transparent and opaque areas on it and the opaque areas correspond to the size, shape and location of the areas of the silicon which are to be doped with impurity during the first diffusion step. A portion of such a photographic pattern is shown in FIG. 3. The adjacent sub-patterns (integrated circuit patterns) are not shown.

The wafer is exposed to ultraviolet light through the photographic pattern, and the regions of the photo resist lying under the transparent portions 61 of the pattern are fully exposed in the photographic sense. The wafer is then washed in a developing solution so that the masking emulsion may be stripped from the wafer in those regions where the emulsion was not exposed to the light; i.e., those regions lying underneath the dark portions 60 of the pattern. The exposed regions of the resist polymerize and are quite adherent to the silicon dioxide. The wafer is then exposed to a hydrofluoric acid etch which strips the oxide from the wafer in the areas denuded of photo resist while the oxide under the remaining resist is unaffected.

Figure 4:
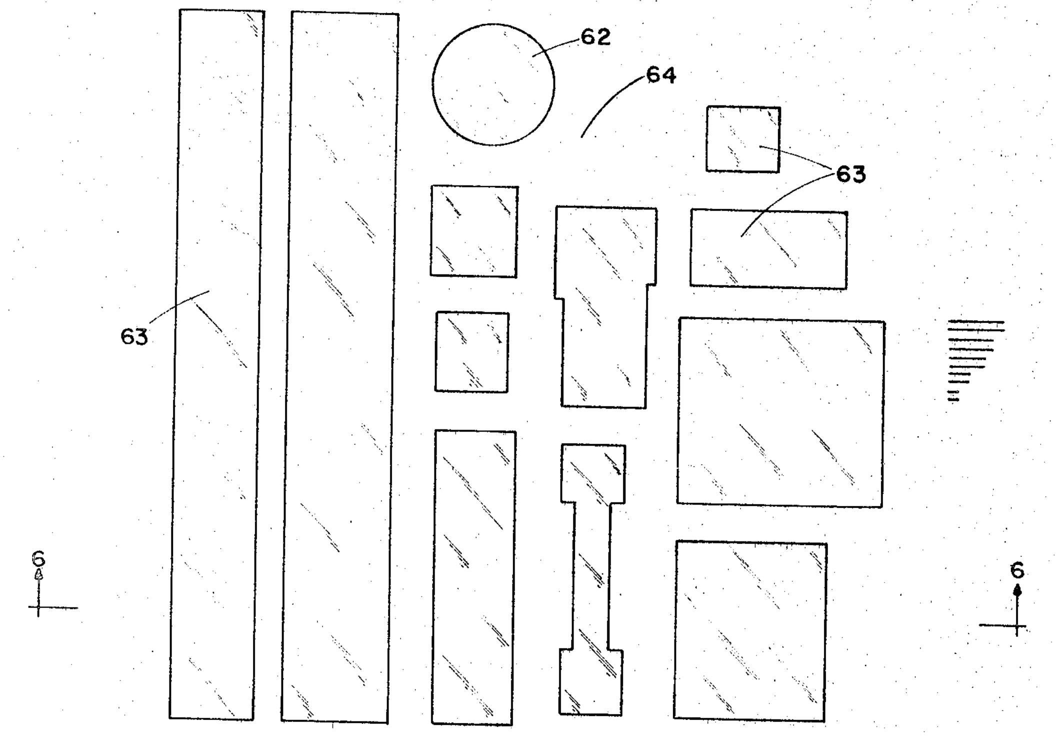
FIG. 4 is a plan view of a control pattern portion of the wafer after photographic treatment with the photographic masking pattern of FIG. 3 and a subsequent etching operation.
Figure 5:
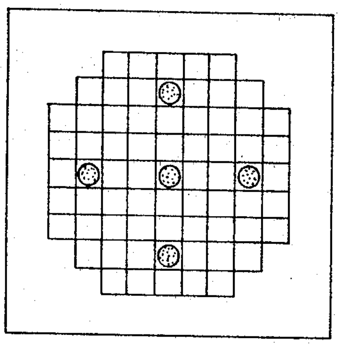
FIG. 5 shows the layout or array of individual integrated circuit and control patterns which comprise a photographic masking pattern.

The resist is then completely removed leaving a silicon wafer with well-defined regions 63 covered with silicon dioxide and other regions 64 stripped of oxide as shown in FIG. 4, a plan view of a control pattern portion of the wafer at this point in the processing. FIG. 5 shows the typical layout of a complete photo mask. Masking detail is not shown but the opaque and clear regions to be found within the squares are for masking purposes with respect to the integrated circuits, and those within the squares arbitrarily identified with circles in FIG. 5 are for masking to form the integral control pattern.

Figure 6:
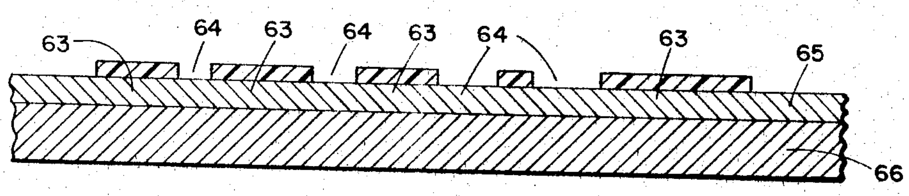
FIG. 6 is a cross section of FIG. 4 at line 6—6.

FIG. 6, a cross section of FIG. 4 at line 6—6, shows the open regions 64 and silicon dioxide covered regions 63 of the epitaxial N type silicon 65 on the P type silicon substrate 66.

The silicon is subsequently exposed to P type impurity material in a solid state diffusion step (see FIG. 7). The silicon dioxide covering the silicon regions 63 masks against the diffusion of impurity into those regions, and only the exposed regions 64 are diffused.

Figure 7:
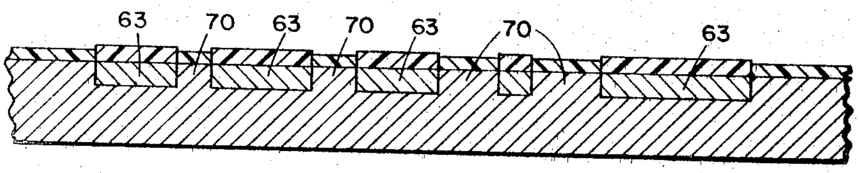
FIG. 7 is the same view as FIG. 6 but following a solid state diffusion step.

In FIG. 7, which is the same view as FIG. 6 but after the P type diffusion step, the N regions 63 are isolated from one another by the P material at 70. Note that the P regions 70 extend from the surface through the epitaxial layer to the underlying P type substrate. For this reason, the first diffusion is called an isolation diffusion, and the photographic sub-pattern (FIG. 3) that is used for isolation diffusion is called an isolation masking pattern. The isolated N regions in integrated circuits are frequently used as transistor collector regions, and this diffusion step is then sometimes referred to as a collector isolation diffusion. The openings in the oxide at 64 in FIG. 6 were filled due to the oxidation of the silicon which takes place during the diffusion process.

Each control pattern, like each partially completed integrated circuit alongside (not shown), is the result primarily of additional selective operations performed on the wafer. Additional areas to be selectively diffused are defined as to location, size and shape photographically and by etching of the masking oxide exactly as previously described for the isolation diffusion. Using current manufacturing procedures, three selective solid state diffusion steps are normally required for an integrated circuit, and it is necessary to recover the oxide denuded areas either during or following each diffusion step by re-oxidizing the silicon as a preparation for subsequent selective diffusions since different areas are involved in each diffusion.

The second diffusion step is usually a P type diffusion, and is preceded by the previously described photo resist and etching procedures so as to open holes in the silicon dioxide such that the P impurity may enter the silicon at these holes during the diffusion step.

Figure 8:
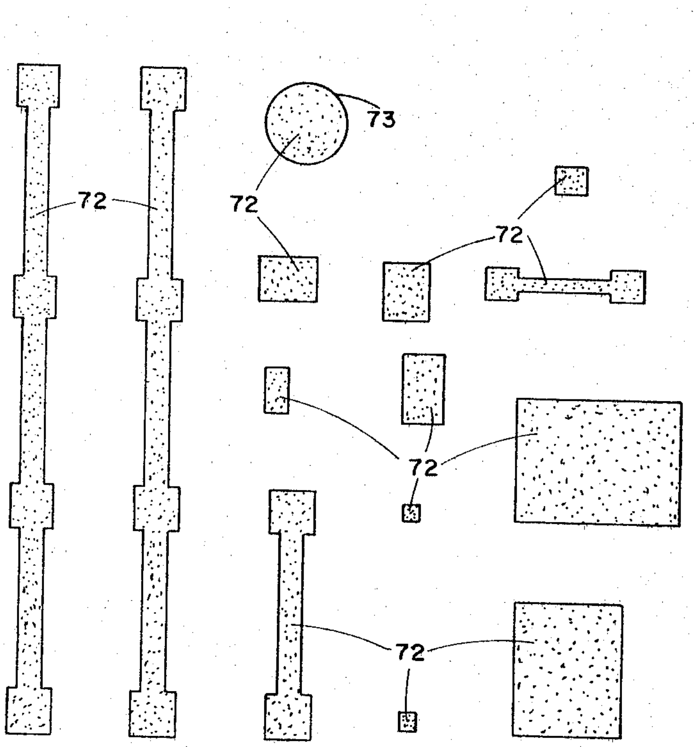
FIG. 8 is a portion of another photographic masking pattern for the preparation of the integral control portion of the wafer for a selective etching operation preceding a P type diffusion step.
Figure 9:
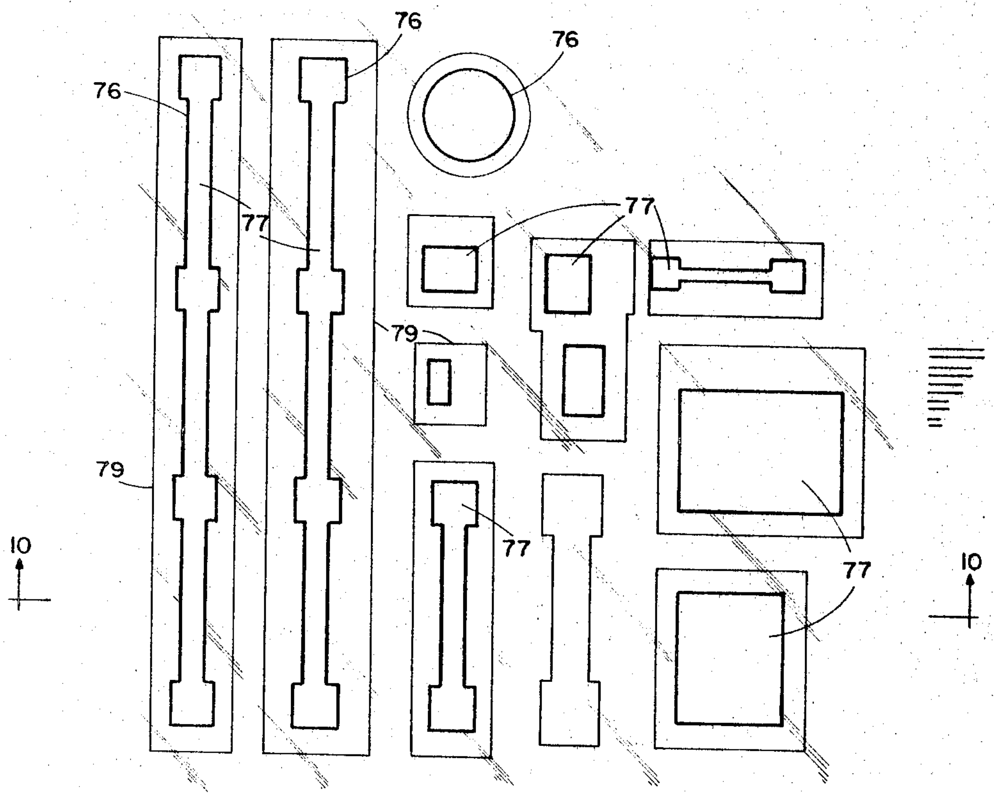
FIG. 9 is a plan view of the wafer following the selective etching operation in preparation for an N type diffusion step.

The control portion of the particular photographic pattern used for exposing the photo resist in masking the silicon dioxide for etching is shown in FIG. 8. In FIG. 8 as in FIG. 3, the opaque portions 72 of the mask correspond to the regions of silicon dioxide to be removed from the wafer. This photographic pattern is oriented and aligned with the wafer with the aid of reference marks. The opaque circle 73 is centered within the circular region 62 (FIG. 4) formed during the first oxide etching operation. (Each successive photographic pattern marking has a reference circle and this centering operation is performed each time a photographic masking pattern is used.) A new layer of oxide has grown over this region, but the boundary is clearly visible. After etching, the open area of the circular region (N type) and the substrate are electrically probed so as to provide information on the results of the isolation diffusion. Following the photographic, etching and P type diffusion steps, the plan view of the control pattern is as shown in FIG. 9. The heavy lines 76 are the boundary of oxide-free regions 77 of silicon. The lighter lines 79 indicate reoxidized boundaries.

Figure 10:
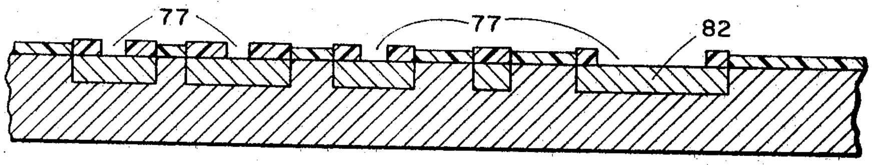
FIG. 10 is a cross section of FIG. 9 at line 10—10.

FIG. 10, a cross section of FIG. 9 at line 10—10, shows the selectively etched oxide-free regions 77 on the silicon in preparation for the P type base diffusion step.

Figure 11:
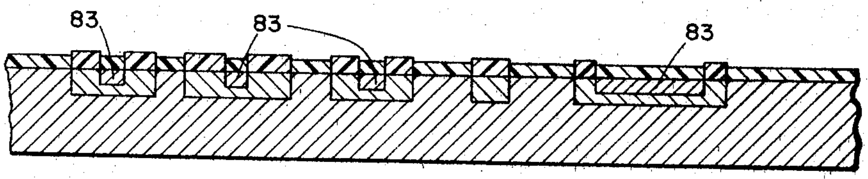
FIG. 11 is the same view as FIG. 10 but after the N type diffusion step has been completed.

FIG. 11 is the same view as FIG. 10 but following the base diffusion step. The regions 77 previously opened for the diffusion of P regions 66 are, as in the previous diffusion, recovered with oxide 83 during the diffusion operation.

Figure 12:
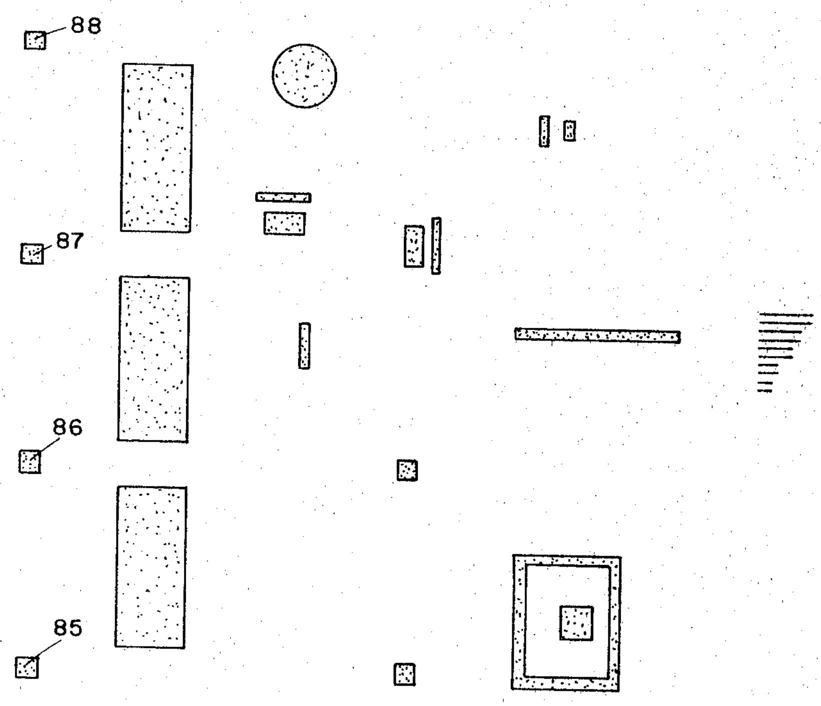
FIG. 12 is a portion of the photographic masking pattern used in preparing the wafer for etching of silicon dioxide and a subsequent selective diffusion step.

The reoxidized wafer subsequently is selectively diffused for the third time. This diffusion is called an emitter diffusion as the emitters of the NPN transistors are made at this time; N type impurity is used. The photographic and etching procedures are as described for the preceding diffusion; the photographic mask used in preparing the resist for etching is shown in FIG. 12. As before, the mask is aligned with the wafer by centering the circular region within the rings on the oxide.

Figure 13:
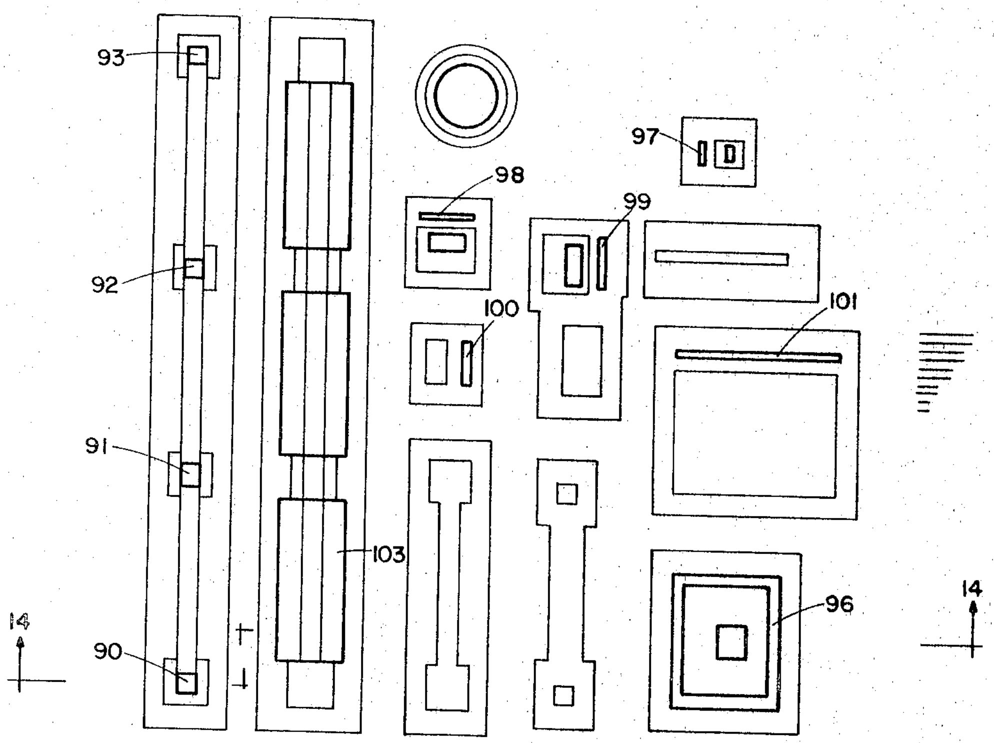
FIG. 13 is a plan view of a control pattern portion of the wafer after photographic treatment with the photographic masking pattern of FIG. 12 and following a subsequent etching operation.
Figure 14:
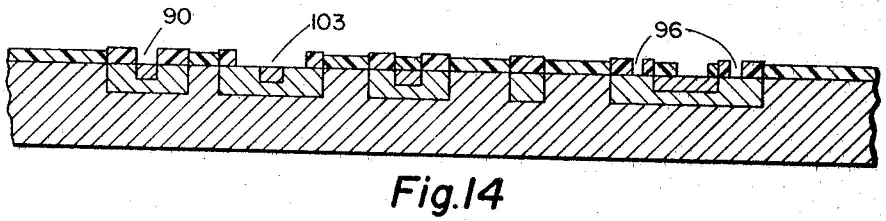
FIG. 14 is a sectional view of FIG. 13 taken at line 14—14.

The four opaque regions 85, 86, 87 and 88 at the left of the photo pattern (FIG. 12) are for opening regions in the oxide on the silicon for making a four-point probe measurement of the resistivity of the base diffusion. The four probe openings 90, 91, 92 and 93 in the oxide are shown in the control pattern of FIG. 13. The frame-like opening 96 is for increasing the level of N impurity in the underlying N region. This is in preparation for an aluminum metallizing operation so that the aluminum will not convert any of the region to P type silicon and form a PN junction. Openings 97, 98, 99, 100 and 101 for similar purposes are made elsewhere on the oxide. The cross sectional view of FIG. 14 taken at line 14—14 of FIG. 13 shows the frame-like opening 96, one of the probe openings, as well as other openings 103 in the oxide film.

If the information found by the use of the four-point probe is satisfactory, processing is continued on the wafer. If unsatisfactory, the wafer is rejected and the process is adjusted to bring the diffusion results within specification.

Figure 15:
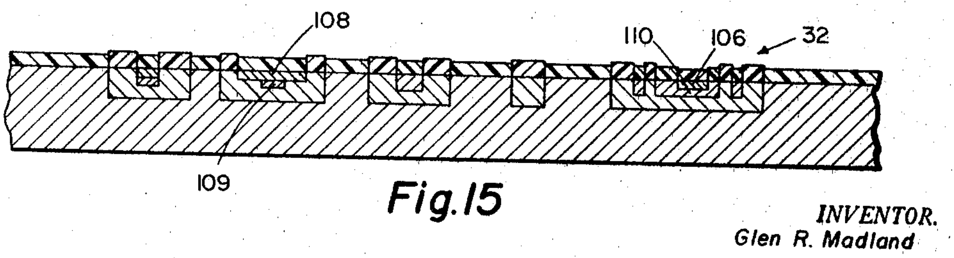
FIG. 15 is the same view as FIG. 14 following a final diffusion operation.
Figure 17:
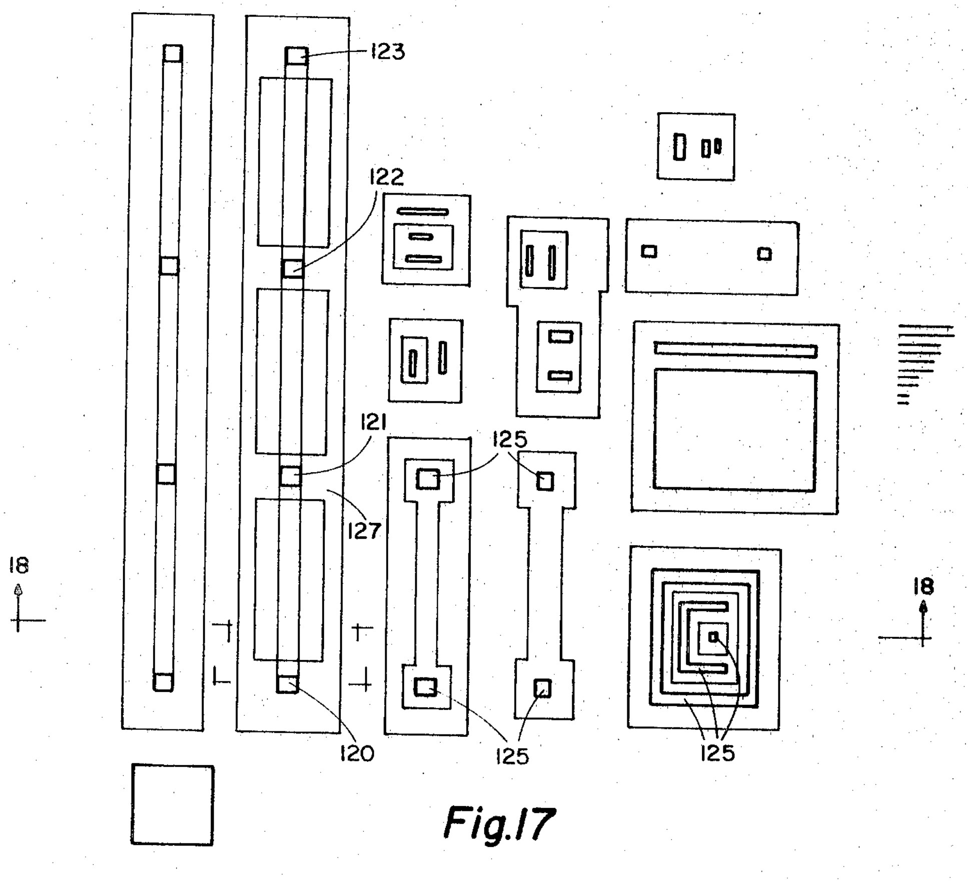
FIG. 17 is the plan view of the wafer after selective oxide removal prior to metallization.

The results of the emitter diffusion are shown in FIG. 15. Impurity has diffused into the regions just probed. The diffused emitter 106 of the large standard transistor 32, is, of course, at the same depth as the diffusion region 108 (as are all other emitters formed at this stage). This diffusion creates a section 109 of the same thickness as the base 110 of the transistor of the test pattern and, those of the integrated circuits. A measurement of resistivity of this region 109 using a four-point probe permits a calculation to be made which gives the base thickness of the NPN transistors on the silicon wafer. The openings 120, 121, 122 and 123 (FIG. 17) for contact by the four-point probe are made in the subsequent selective etching operation.

Figure 16:
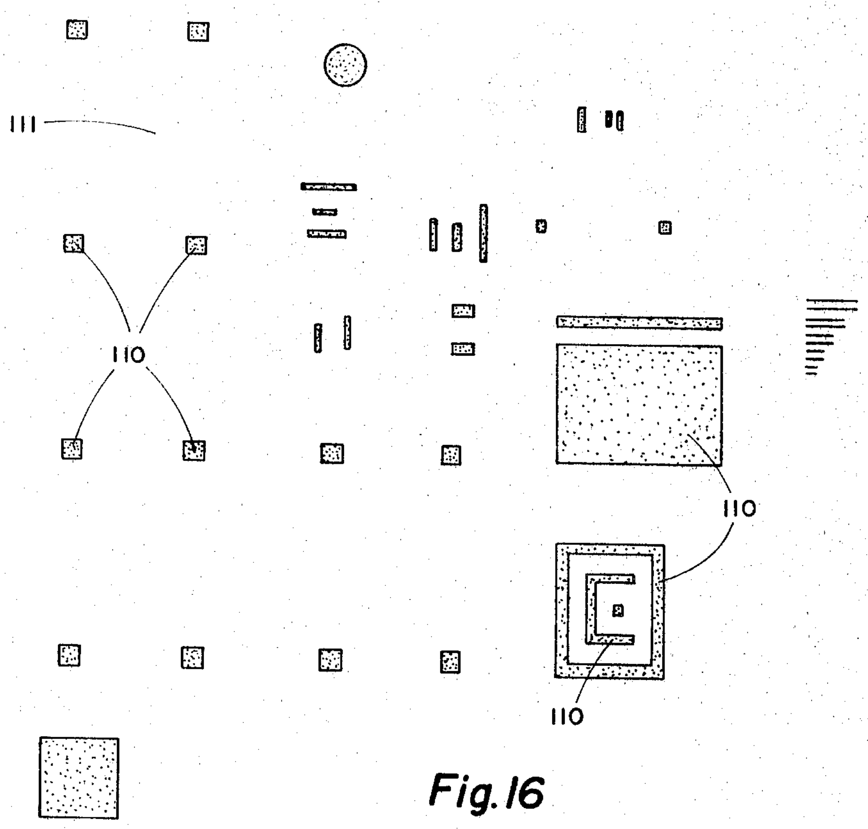
FIG. 16 is the photographic masking pattern used in the selective oxide etching process in order to prepare the wafer for metallization and provide for ohmic contacts to the various components.
Figure 18:
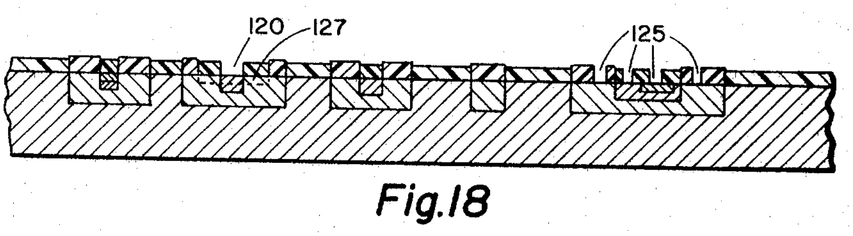
FIG. 18 is a sectional view of FIG. 17 taken at line 18—18.

This next etching operation in which silicon dioxide is stripped from selected regions is not just in preparation for another diffusion, but rather to expose the silicon so that metals may be placed upon it for electrical contact. The photographic pattern of opaque region 110 and clear region 111 is shown in FIG. 16. As before, resist is placed on the wafer, covered with the pattern, exposed to light, the unexposed resist removed, and the oxide selectively etched away from the probe openings 120, 121, 122 and 123 and other openings 125 are placed in the oxide as shown in plan view (FIG. 17), and in sectional view (FIG. 18) taken at line 18—18 of FIG. 17. The base resistivity measurement is taken using the four-point probe at the probe openings 120, 121, 122 and 123.

Figure 19:
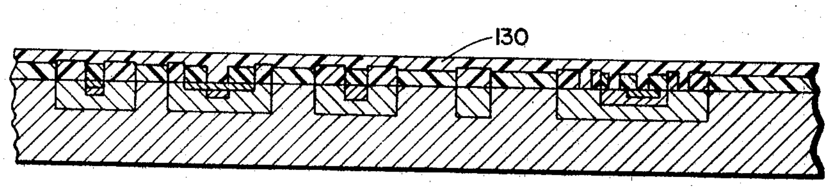
FIG. 19 is the view of FIG. 18 but after aluminum has been evaporated across the surface of the wafer.
Figure 20:
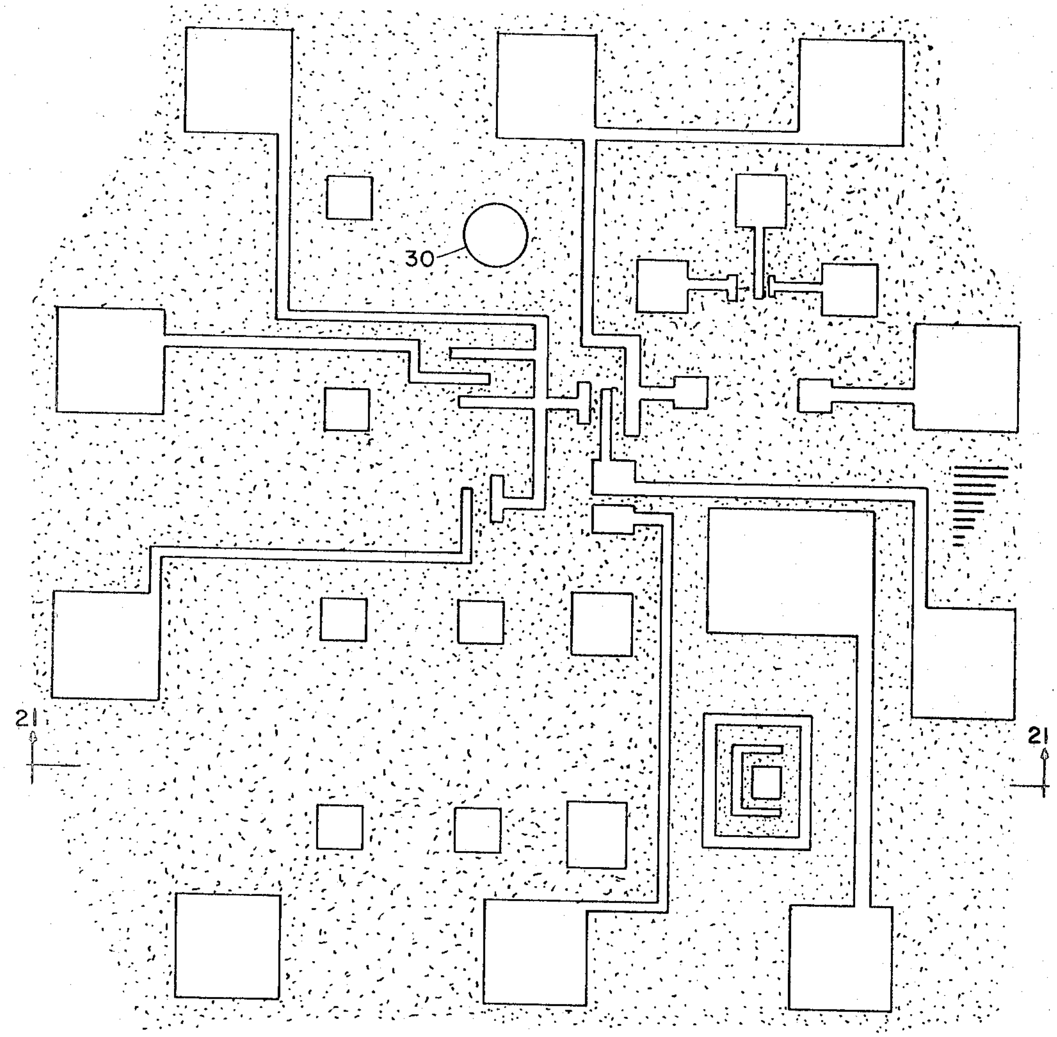
FIG. 20 is the photographic masking pattern used to expose the photo resist emulsion to prepare it as an etching mask in order that portions of the aluminum metallization may be selectively etched away.
Figure 21:
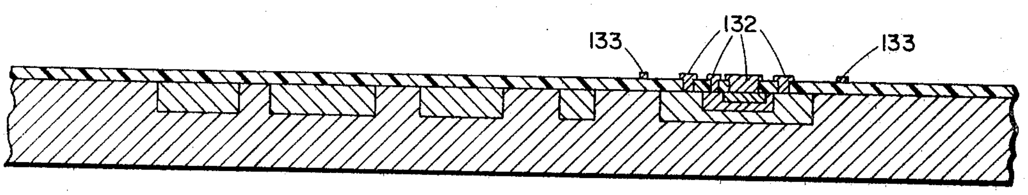
FIG. 21 is a cross sectional view of the wafer after the aluminum has been etched.

An aluminum film 130 is evaporated on the face of the wafer as a continuous film (FIG. 19). The photo resist emulsion is coated over the aluminum and the metallizing photo mask (FIG. 20) is placed on the wafer. After exposure to light to form the etch pattern in the resist, the aluminum not covered by the resist is etched away leaving contacts 132 and connections 133 (FIG. 21). After etching the final pattern is as shown in FIG. 1.

Figure 22:
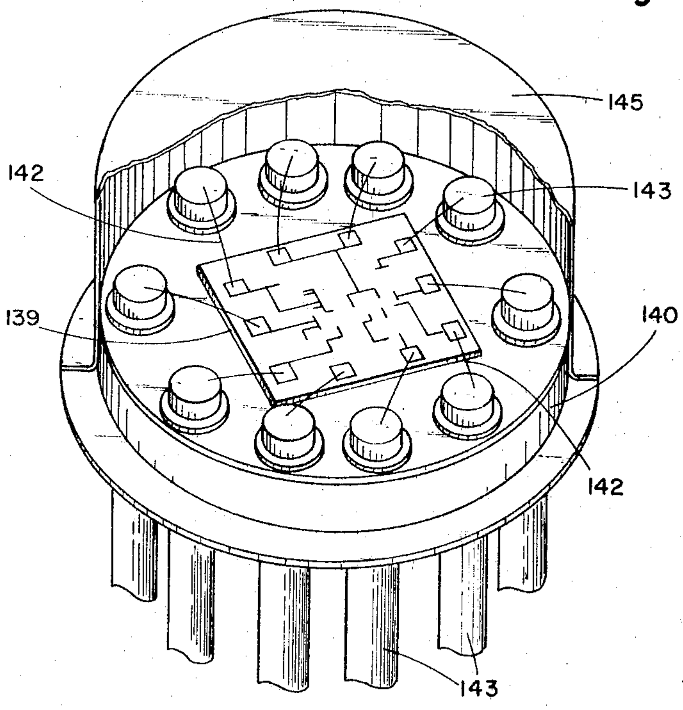
FIG. 22 is a completely fabricated integral circuit package.

The integral test pattern and the individual integrated circuits are separated from each other in a well-known scribe-and-break operation. Using a diamond pointed stylus, lines are machine scored in the form of a grid across the wafer so that one integrated circuit or control pattern lies within each small rectangle so formed. The wafer is then physically stressed so as to break along the scored lines into small rectangular units each with a circuit or pattern. These units are called chips 139. Chips 139 are then mounted (FIG. 22) on a header 140 and thermocompression bonded on the fine wires 142 to establish contact from the terminal portions of the chips to the leads 143 of the header. The device is protectively enclosed by welding a cap 145 on the header 140. The completed assemblies are called integral circuit packages.

The test patterns, which include the sub-patterns as well as the composite pattern (FIG. 1), have a number of uses.

The alignment of each photo mask used is critical and each mask used must be oriented properly relative to the mask used previously. To assure this alignment, figures are included in the test pattern which are specifically designed for aligning the pattern (and the integrated circuit pattern at the same time). The concentric circles 30 in FIG. 1 are for alignment; each result from the use of a particular pattern. Each circle on a photo mask is centered relative to another formed on the oxide in preceding steps. It is quite easy to center circles relative to each other as the eye is very sensitive to errors in concentricity. The circles are also clearly evident through aluminum metallization and their usefulness is not reduced by covering with the metal.

The degree of photographic resolution obtained in using the patterns is also most important, especially when working with the smaller components and parts of components in the circuit. Small regions such as transistor emitters, and tiny openings for ohmic contacts are especially critical since poor definition of such small regions can cause significant changes in the area and shape of such regions. Resolution figures 33 have, therefore, been incorporated into the test pattern which will give a measure of the resolution being achieved so that adjustments may be made to control this phase of the process. The resolution lines are clear, fine and well-defined on a good photo mask. When the photo resist is exposed beneath the photo mask, these lines should reproduce well. If the lines are not of good quality and are fuzzy and broad, for example, then the resolution is poor. If the resolution is not satisfactory, the resist may be stripped from the wafer and the photo process repeated to obtain the desired definition and clarity of the resolution pattern.

There are a number of in-process electrical tests which may be performed on the control pattern rather than on the integrated circuit to preclude the possibility of damage to the circuit.

Based upon the results of these tests, appropriate process control steps may be taken. A few of the tests possible are noted below.

Electrical connection with a probe is made to the substrate and the collector region of the standard transistor 32 in the test pattern, and then the collector-to-substrate breakdown voltage can be measured prior to base diffusion. The region 82 (FIG. 9), which ultimately will be the collector of the large transistor, is used for this purpose. Contact to this region 82 for the test is made by probing after the oxide has been etched in preparation for the base diffusion. At this stage, the degree of collector isolation can also be determined by probing region 82 or other isolated areas of the test pattern after etching for the next diffusion. Following the diffusion used to form the base and emitter regions, this transistor may be used to determine the collector-base breakdown voltage. As previously indicated, these measured values may be expected, to a measurable degree of confidence, to be representative of the values to be found in the transistors of the integrated circuit.

Since oxide films are formed as part of diffusion processing, small openings must be made in the oxide after each diffusion for probing purposes. The photo masks for the oxide removal operation for the next processing step are provided with small opaque regions in their control patterns for opening holes for probing purposes.

Since most integrated circuit designs depend on resistor component accuracy for proper functioning, it is necessary that the resistivity of the diffused regions used to form them be measured. Using a four-point probe applied to regions 90, 91, 92 and 93 (FIG. 13), the resistivity of the base diffusion test region may be measured quite accurately. The resistivity of other regions of interest may also be measured less accurately with two-point probes. The resistivity of the epitaxial material after isolation diffusion and the base resistivity after emitter diffusion are measured in this manner.

Tests of capacitance with applied voltage for junctions may be made to give an approximate curve of the distribution of impurity within the silicon. The junction capacitor 49 (FIG. 1) is especially suited for this purpose.

Minority carrier lifetime may be obtained by measuring the diode recovery time of the PN diode 38 and the NP diode 40 (FIG. 1).

Transistor base width may be also determined by measurement on the pattern. The base width unit is formed by a diffusion during the regular transistor base diffusion. This is followed by an emitter diffusion to form the structure 127 shown in FIG. 17 and FIG. 18. Using a four-point probe, the resistivity of the base material under the emitter material is measured, and this value is related to base width.

The completed standard transistor 32 after metallization is used to measure low frequency current gain. The small transistor 31 is used for high frequency measurements.

Other process control electrical tests may be performed and others are under investigation.

Figure 23:
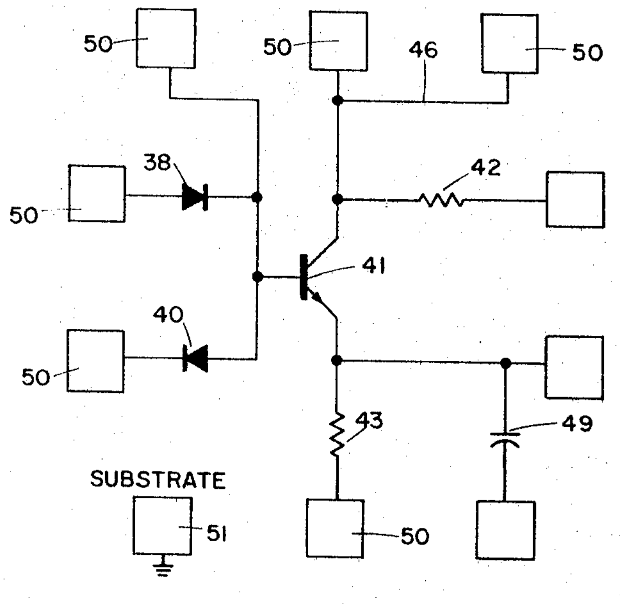
FIG. 23 is a schematic diagram of an integral control circuit suitable for step-stress testing.

For reliability control, the test pattern also has an operating circuit consisting of a transistor, two diodes, two resistors, a junction-type capacitor, and a short circuit. The circuit portion of FIG. 1 is shown schematically in FIG. 23.

The reliability test circuit 23 is formed in the test pattern at the same time as the process control parts and the integrated circuits. Five patterns are usually used (FIG. 2). On completion of the integrated circuits, the integral control pattern chips with the reliability test circuit are scribed from the wafer along with the integrated circuit chips and assembled on headers, electrically connected to the leads of the header, encapsulated and placed on appropriate test to determine the reliability of each group. The connections to the circuit are so arranged that maximum stress may be applied to each component without being affected or affecting the other components to any great degree.

Records of the process control measurements and the tests on the reliability control circuit are evaluated to determine if the quality level of the product is satisfactory and then if it is, the circuit is released to the customer.

The control circuits are subjected to accelerated life testing to provide equivalent information on the integrated circuits since in most cases integrated circuits cannot be directly tested in a satisfactory manner.

As is apparent, the invention provides a simple, direct, non-destructive and economical method for providing (1) control information which may be used after each process step performed on a wafer, (2) and continuous step-stress operating and storage life tests on control circuits with components having identical characteristics with those used in the actual integrated circuits.

I claim:

1. A method of inferring the separation distance between parallel planes formed by pairs of superposed PN junctions on a semiconductor substrate by determining the separation of other PN junctions formed on said substrate concurrently in the same processing operations, said method comprising the steps of diffusing an elongated and uniform region of one conductivity type into a region of a second conductivity type in a semiconductor substrate, said diffusion extending into the semiconductor material from the surface thereof and forming a PN junction with said second conductivity type region and with said PN junction extending from said surface to a depth *a*, selectively diffusing over parts of said elongated region three separated regions of second conductivity type material in such a manner as to form PN junctions with said first conductivity type material a distance *b* from the surface of said semiconductor material and less than the distance *a*, thereby creating three buried regions of said one conductivity type material and four contact regions of said one conductivity material extending to the surface of said semiconductor material and connected to said buried regions, electrically probing said contact regions and making electrical measurements with the probes to determine the resistivity of said buried regions, and determining from said resistivity measurements the thickness of said buried regions, said thickness being the distance $a-b$ which to a high degree of approximation is the separation distance between all of said superposed PN junctions.

2. A method of controlling processes by which a plurality of integrated circuits are fabricated on a single wafer of semiconductor material, said method comprising: forming in a plurality of steps a plurality of corresponding layers of semiconductor material alternately of opposite conductivity types, photolithographically shaping said layers to form functional integrated circuit structures and non-functional control structures, and measuring the electrical characteristics of the semiconductor layers forming said non-functional control structures at preselected ones of the plurality of steps taken to form said plurality of layers of semiconductor material, whereby data may be obtained which indicates where the process specifications for the fabrication of the functional integrated circuit structures are being met throughout the layer forming process and said process may be altered in accordance with data obtained from the measuring of said electrical characteristics of the semiconductor layers forming the non-functional control structures.

3. A method of controlling processes by which a relatively large number of functional semiconductor structures are fabricated in a wafer of semiconductor material and by which a relatively small number of non-functional semiconductor control structures are simultaneously fabricated in the same wafer of semiconductor material and tested at periodic steps in the fabrication process to determine the reliability of said functional structures which include transistors having base, emitter and collector regions, said method comprising: forming in a plurality of steps a plurality of corresponding layers of semiconductor material alternately of opposite conductivity types, photolithographically shaping said layers to form integrated circuit transistors, non-functional control structures and other passive integrated circuit components, electrically attaching a probe to the layer of one of said non-functional control structures which corresponds to the semiconductor layer forming the collector region of said transistors and electrically attaching a connecting probe to the substrate region of said wafer prior to forming said base region of said transistors in order to measure the collector-to-substrate breakdown potential of said transistors.

4. The method according to claim 3 which includes electrically probing isolated areas in the layer of one of said non-functional control structures corresponding to the collector regions of said transistors in order to determine the degree of collector isolation prior to forming the base regions of the transistors.

5. A method of approximating the separation distance between semiconductor PN junctions on a semiconductor substrate by determining the separation distance between other PN junctions formed on the same substrate concurrently in the same processing operation, said method comprising the steps of: diffusing a semiconductor region of one conductivity type into a semiconductor region of a second conductivity type on a semiconductor substrate, the diffusion extending into the second conductivity type region at a first depth from the surface thereof and forming a first PN junction therewith, diffusing a region of second conductivity type semiconductor into said region of one conductivity type semiconductor in such a manner as to form a second PN junction with said one conductivity type region and extending a second depth into the semiconductor material forming said one and second conductivity type regions, thereby creating contact areas on the surface of said one conductivity type semiconductor region at the surface of said semiconductor material and on opposite sides of said second conductivity type semiconductor region, electrically probing said contact areas, and with the use of electrical probes, measuring the resistivity of said semiconductor region of said one conductivity type beneath said semiconductor region of said second conductivity type whereby the thickness of said semiconductor region of said one conductivity type may be determined.

6. The method according to claim 5 which includes forming the semiconductor layers which comprise both the base regions of the transistors and the corresponding test layers of the non-functional control structures and thereafter electrically probing the test layers of said non-functional control structures which correspond to the collector and base regions of said transistors in order to determine the collector-to-base breakdown voltage of said transistors.

7. The method according to claim 6 which includes forming the semiconductor layers which comprise both the emitter regions of the transistors and the corresponding test layers of the non-functional control structures and thereafter electrically probing the test layer of said control structures corresponding to the base regions of said transistors to determine the resistivity of the base regions of said transistors.

8. The process according to claim 7 which includes electrically probing adjacent semiconductor layers defining PN junctions in said non-functional control structures which correspond to PN junctions of said transistors in order to determine the transistor PN junction capacitance and the minority carrier lifetime of charge carriers crossing a transistor PN junction.

References Cited by the Examiner

UNITED STATES PATENTS

| | | | |
|---|---|---|---|
| 2,868,988 | 1/1959 | Miller | 148—1.5 X |
| 3,005,937 | 10/1961 | Wallmark | 148—186 X |
| 3,181,983 | 5/1965 | Lape | 148—1.5 |
| 3,184,823 | 5/1965 | Little | 148—189 X |
| 3,192,141 | 5/1965 | Fry | 148—1.5 |
| 3,212,943 | 10/1965 | Freck et al. | 148—177 X |
| 3,226,612 | 12/1965 | Haenicher | 148—186 X |

HYLAND BIZOT, *Primary Examiner.*